(12) United States Patent
Neumann et al.

(10) Patent No.: US 11,995,834 B2
(45) Date of Patent: May 28, 2024

(54) METHOD AND SYSTEM FOR THE AUTOMATED DETERMINATION OF EXAMINATION RESULTS IN AN IMAGE SEQUENCE

(71) Applicant: Siemens Healthcare GmbH, Erlangen (DE)

(72) Inventors: Dominik Neumann, Erlangen (DE); Mehmet Akif Gulsun, Princeton, NJ (US); Tiziano Passerini, Plainsboro, NJ (US)

(73) Assignee: SIEMENS HEALTHINEERS AG, Forchheim (DE)

( * ) Notice: Subject to any disclaimer, the term of this patent is extended or adjusted under 35 U.S.C. 154(b) by 0 days.

(21) Appl. No.: 18/165,510

(22) Filed: Feb. 7, 2023

(65) Prior Publication Data

US 2023/0252636 A1 Aug. 10, 2023

(30) Foreign Application Priority Data

Feb. 9, 2022 (DE) ............. 10 2022 201 347.6

(51) Int. Cl.
*G06K 9/00* (2022.01)
*G06T 7/00* (2017.01)
*G06T 7/13* (2017.01)
*G06T 7/181* (2017.01)
*G06T 7/38* (2017.01)

(52) U.S. Cl.
CPC ............. *G06T 7/0016* (2013.01); *G06T 7/13* (2017.01); *G06T 7/181* (2017.01); *G06T 7/38* (2017.01);
(Continued)

(58) Field of Classification Search
CPC ......... G06T 7/0016; G06T 7/181; G06T 7/38; G06T 7/13; G06T 2207/10016;
(Continued)

(56) References Cited

U.S. PATENT DOCUMENTS

2014/0301618 A1 10/2014 Popovic et al.
2016/0235388 A1 8/2016 Zhang et al.

FOREIGN PATENT DOCUMENTS

CN 109978915 A 7/2019
CN 111739064 A 10/2020
(Continued)

OTHER PUBLICATIONS

Javed, Sajid, et al. "Multiplex cellular communities in multi-gigapixel colorectal cancer histology images for tissue phenotyping." IEEE Transactions on Image Processing 29 (2020): 9204-9219. (Year: 2020).*

(Continued)

*Primary Examiner* — Jonathan S Lee
(74) *Attorney, Agent, or Firm* — Harness, Dickey & Pierce, P.L.C.

(57) ABSTRACT

One or more example embodiments of the present invention relates to a method for the automated determination of examination results in an image sequence from multiple chronologically consecutive frames, the method comprising determining diagnostic candidates in the form of contiguous image regions in the individual frames for a predefined diagnostic finding; and for a number of the diagnostic candidates, determining which candidate image regions in other frames correspond to the particular diagnostic candidate, determining whether the candidate image regions of the particular diagnostic candidate in the other frames overlap with other diagnostic candidates, generating a graph containing the determined diagnostic candidates of the frames as nodes and the determined overlaps as edges, and generating communities from nodes connected via edges.

20 Claims, 4 Drawing Sheets

(52) U.S. Cl.
CPC ............... *G06T 2207/10016* (2013.01); *G06T 2207/10116* (2013.01); *G06T 2207/20076* (2013.01); *G06T 2207/20081* (2013.01); *G06T 2207/20084* (2013.01); *G06T 2207/20212* (2013.01); *G06T 2207/30101* (2013.01)

(58) Field of Classification Search
CPC . G06T 2207/10116; G06T 2207/20076; G06T 2207/20081; G06T 2207/20084; G06T 2207/20212; G06T 2207/30101
USPC ........................................................ 382/132
See application file for complete search history.

(56) References Cited

FOREIGN PATENT DOCUMENTS

| CN | 113302649 A | 8/2021 |
|---|---|---|
| WO | WO 2020078252 A1 | 4/2020 |

OTHER PUBLICATIONS

Faskowitz, Joshua, et al. "Edge-centric functional network representations of human cerebral cortex reveal overlapping system-level architecture." Nature neuroscience 23.12 (2020): 1644-1654. (Year: 2020).*

German Office Action and English translation thereof dated Jan. 13, 2023.

German Office Action and English translation thereof dated Jul. 31, 2023.

German Decision to Grant and English translation thereof dated Sep. 27, 2023.

Wikipedia Artikel Centrality (EN), (Stand: Aug. 12, 2021) https://web.archive.org/web/20210812062518/https://en.wikipedia.org/wiki/Centrality.

Wikipedia Artikel Community structure (EN) (Stand: Aug. 8, 2021) https://web.archive.org/web/20210808133753/https://en.wikipedia.org/wiki/Community_structure.

Cong, C.; Kato, Y. et al.:"Automated Stenosis Detection and Classification in X-ray Angiography Using Deep Neural Network", in: IEEE International Conference on Bioinformatics and Biomedicine, pp. 1301-1308, 2019.

Gharbi Hana et al:"Key frame extraction for video summarization using local description and repeatability graph clustering". Signal, Image and Video Processing, 2019, vol. 13. Jg., Nr. 3, https://doi.org/10.1007/s11760-018-1376-8, p. 507-515.

Danilov, V.V.; Klyshnikov, K.Y. et al.: "Real-time coronary artery stenosis detection based on modern neural networks", in: Nature Scientific Reports, vol. 11:7582, 2021.

* cited by examiner

METHOD AND SYSTEM FOR THE AUTOMATED DETERMINATION OF EXAMINATION RESULTS IN AN IMAGE SEQUENCE

CROSS-REFERENCE TO RELATED APPLICATION(S)

The present application claims priority under 35 U.S.C. § 119 to German Patent Application No. 10 2022 201 347.6, filed Feb. 9, 2022, the entire contents of which are incorporated herein by reference.

FIELD

One or more example embodiments of the present invention relates to a method and a system for the automated determination of examination results in an image sequence, such as in the field of medicine, including in an angiography sequence. One or more example embodiments of the present invention preferably relates to a graph-based aggregation of diagnostic findings in (coronary) angiography for a temporal consistency and in particular also for multiple viewing angles.

RELATED ART

In medicine, as in other fields, the automated detection of dynamic operational sequences is of advantage. This is explained in greater detail below, taking angiography as an example.

Angiography is a common examination method in medicine, in which a radiological display of vessels, in most cases blood vessels, is performed using diagnostic imaging methods, for example X-ray tomography or magnetic resonance tomography. In an angiogram, blood vessels are readily apparent on "frames" of a body region. These frames are individual images or projection images.

The automated evaluation of examinations in connection with coronary X-ray angiography for the consistent identification, localization and precise quantification of clinically relevant diagnostic findings (e.g. stenoses) across multiple images and multiple views (frames) calls for robust data processing and sophisticated algorithms. For example, among the capabilities that a system providing functions for the automatic derivation and communication of diagnostic findings from angiography examinations may require are the following:

- identification of relevant or the best diagnostic views,
- identification of the best cardiac cycle for an assessment or the best frame or frames for each lesion (good contrast, etc.) in a typical sequence of multiple cardiac cycles in the diagnostic views,
- segmentation of the vessel lumen,
- labeling of branches,
- identification and classification of a stenosis in each frame,
- aggregation of identified stenoses (and evaluation results) across multiple frames (and multiple views),
- reports that people can read, including listing of diagnostic findings, key images, where appropriate simplified diagrams, etc.

Angiograms are typically assessed manually by medical experts. In this case they rely on their experience and on information from multiple views during the entirety of the cardiac cycle, in order to track diagnostic findings (lesions, stenoses, total occlusions and other anomalies) with a high degree of reliability and to select the best frame or frames for a precise analysis (identification, classification, localization, qualitative comparative analysis (QCA), further evaluation).

In recent times some publications have concentrated on the automation of some of these aspects. However, these describe small generic, expandable mechanisms for the analysis of results on one entire level of an X-ray angiography examination, in which the use of "evidence" from all available data is maximized across multiple timeframes and multiple views, and no action by a user is required. For example, V. Danilov et al ("Real-time coronary artery stenosis detection based on modern neural networks," Nature Scientific Reports, vol. 11:7582, 2021) concentrates on the detection of stenoses at frame level using standard neural network architectures. C. Cong et al. ("Automated stenosis detection and classification in X-ray angiography using deep neural network," IEEE International Conference on Bioinformatics and Biomedicine, pp. 1301-1308, 2019) describes a multi-stage framework for the selection of views, the selection of frames and stenosis classification/identification on the basis of activation maps and a basic classification step which attempts to classify a frame into two classes: whether or not said frame shows a significant stenosis. However, this takes place at image level and not at stenosis level, and no proper integration of QCA or grading at stenosis level is described.

SUMMARY

Despite these approaches, automation of such examinations, in particular in the medical field, has not yet gained acceptance and they are still carried out "manually" by specialists. The reason for this is that although individual images can be examined on an automated basis, e.g. using appropriately trained machine learning algorithms (often deep-learning models), nevertheless it is not possible to evaluate the entire image sequence due to the absence of interrelationships.

It is an object of one or more example embodiments of the present invention to specify a method and a corresponding system for the automated determination of examination results in an image sequence, with which the disadvantages described above can be avoided and in particular medical image sequences can be examined on an automated basis. The aim in this case is not to preempt the diagnosis by specialists, but to be able to provide them with optimal preparatory work.

According to one or more example embodiments, a method for an automated determination of examination results in an image sequence from multiple chronologically consecutive frames includes determining diagnostic candidates as contiguous image regions in individual frames for a predefined diagnostic finding; and for a number of the diagnostic candidates, determining which candidate image regions in other frames correspond to a particular diagnostic candidate, determining whether the candidate image regions of the particular diagnostic candidate in the other frames overlap with other diagnostic candidates, generating a graph containing the determined diagnostic candidates of the frames as nodes and the determined overlaps as edges, and generating communities from nodes connected via edges.

According to one or more example embodiments, the method further includes outputting the communities for further examinations.

According to one or more example embodiments, the diagnostic candidates are representatives of medical diagnostic findings.

According to one or more example embodiments, the determining the diagnostic candidates includes generating a feature map in an examined frame, the feature maps including regions that are marked with at least one probability value for a corresponding diagnostic candidate of the diagnostic candidates; forming contiguous image regions based on the feature map; and output of the regions as the diagnostic candidates.

According to one or more example embodiments, the forming includes comparing the probability values of the feature map to a limit value, the contiguous image regions including the image regions in which the probability values exceed the limit value.

According to one or more example embodiments, the determining the corresponding candidate image regions in other frames includes assessing a deformation field including modeling a movement between a first frame and a second frame; and registering of an image region of the diagnostic candidate of the first frame to a candidate image region of the second frame using the deformation field.

According to one or more example embodiments, the method further includes weighting the edges, the weighting being based on at least one of a degree of overlap, a chronological interval between the frames, a similarity, a probability, or an uncertainty value.

According to one or more example embodiments, the generating generates the communities by trimming at least one of the edges or the nodes based on predefined criteria, or using community algorithms.

According to one or more example embodiments, the generating the communities includes assigning multiple diagnostic findings in the same frame to a same community.

According to one or more example embodiments, the method further includes evaluating a structure of at least one of the communities, the evaluating including selecting one frame in the image sequence as a key frame, wherein the key frame is selected for an identified diagnostic finding by determining a node that is has maximum support within the community.

According to one or more example embodiments, the method is performed for a plurality of image sequences from multiple chronologically consecutive frames acquired from different acquisition positions or during different examinations, and the diagnostic candidates from the image sequences are combined in the graph.

According to one or more example embodiments, a system for an automated determination of examination results in an image sequence from multiple chronologically consecutive frames includes a diagnostic study unit configured to determine diagnostic candidates as contiguous image regions in individual frames for a predefined diagnosis; a propagation unit configured to determine for a diagnostic candidate in a frame as to which candidate image regions in other frames correspond to the diagnostic candidate; a relation unit configured to determinate overlaps, the overlaps indicating whether the candidate image regions of the diagnostic candidate in the other frames overlap with other diagnostic candidates; a graph unit configured to generate a graph containing the determined diagnostic candidates in the frames as nodes and the determined overlaps as edges; a community unit configured to generate communities from the nodes connected via edges; and one of an output unit configured to output the communities, or a diagnostic study unit configured to further examine the communities.

According to one or more example embodiments, the system is configured to process a plurality of image sequences from multiple chronologically consecutive frames acquired from different acquisition positions or during different examinations, and the diagnostic candidates from the image sequences are combined in the graph.

According to one or more example embodiments, the system further includes a key frame unit configured to determine a key frame using properties of a structure of at least one community.

According to one or more example embodiments, a medical technology system comprising a system according to one or more example embodiments.

According to one or more example embodiments, a non-transitory computer program product includes commands which when the program is executed by a computer cause said computer to execute a method according to one or more example embodiments.

According to one or more example embodiments, a non-transitory computer-readable medium comprises commands which when executed by a computer cause said computer to execute a method according to one or more example embodiments.

BRIEF DESCRIPTION OF THE DRAWINGS

The invention is described once again in greater detail below using exemplary embodiments with reference to the appended figures. In this case the same components in the different figures are provided with identical reference characters. The figures are in general not drawn to scale. In the figures.

DETAILED DESCRIPTION

Figure 1:
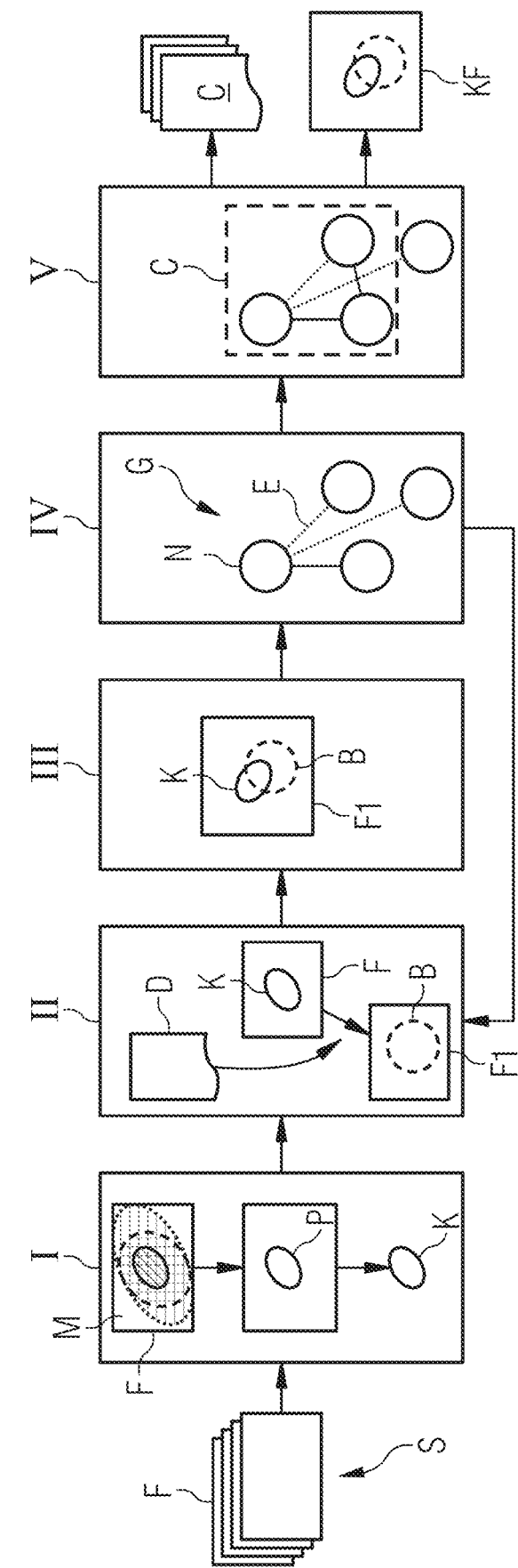
FIG. 1 shows a block diagram of the operational sequence of an exemplary method.

One or more example embodiments is used for the automated determination of examination results in an image sequence from multiple chronologically consecutive frames. In connection with the invention the individual images of the image sequence are referred to as "frames". The image sequence is preferably a medical image sequence, in particular an angiography sequence, and always shows the same motif. Although a movement of the acquisition unit is definitely possible (if this is known and can be mathematically determined), nevertheless it is preferable for each frame to show exactly the same scene (wherein the acquired object can itself definitely move, for example a beating heart). Although the individual images (frames) are preferably 2D images (in particular projection images, e.g. X-ray images or ultrasound images), nevertheless the method can definitely also be performed using 3D images as frames (e.g. with reconstructed CT or MRT frames).

The method comprises the following steps:
determination of diagnostic candidates in the form of contiguous image regions in the individual frames for a predefined diagnostic finding,
for a number of the diagnostic candidates (in particular for all of them):
determination for a diagnostic candidate in a frame as to which candidate image regions in other frames correspond to the diagnostic candidate, determination of overlaps which specify whether the candidate image regions of the diagnostic candidate in the other frames overlap with other diagnostic candidates, generation of a graph containing the determined diagnostic candidates in the frames as nodes and the determined overlaps as edges, generation of communities from nodes connected via edges, nodes being combined to form a community.

The communities can now be output or used for further examinations, e.g. for multi-frame examinations. The use of the method in connection with an X-ray angiography examination is preferable, in particular for automatic stenosis identification or stenosis evaluation, quantitative coronary angiography (QCA) or lumen segmentation.

In the method a diagnostic finding is predefined. This can be done manually, in presettings, or is laid down by the selection and training of a diagnostic study entity. In the case of angiography the diagnostic finding can be a stenosis, for example. Since this involves working with a chronological sequence of frames, the method is particularly advantageous for diagnostic findings that relate to a dynamic phenomenon, i.e. something for which the diagnostic study can be derived from a chronological operational sequence. An automatic diagnostic study in the frames can be undertaken by a trained machine-learning model, as is explained more fully below. In theory the diagnostic study can also be carried out by specialist personnel.

The determined diagnostic candidates are contiguous image regions in the individual frames. In the case of digital images these image regions are preferably pixel regions (whereby individual pixels are also included). In principle other types of data not arranged in a pixel matrix, e.g. point clouds, surface meshes or restricted vectorized areas, could also be used for the image regions. The following procedures can however very easily be imagined with pixel regions as image regions.

The further steps of the method are performed for a number of the diagnostic candidates. The method is particularly effective if the steps are performed for all diagnostic candidates, wherein in the case of compute-intensive evaluations individual diagnostic candidates can definitely be ignored, e.g. if they rely on obvious erroneous estimations. However, an erroneous estimation for a diagnostic candidate can also be identified by performing the subsequent steps.

The subsequent steps are based on graph theory. This relates to graphs from sets of nodes and edges (i.e. "connections" between the nodes), in particular the properties of the nodes and the relationships of the nodes to one another. In graph theory the abstract structure of the network arising in this manner from nodes and edges is examined, said network being referred to as a "graph structure" or simply as a "graph".

One or more example embodiments of the present invention uses graph theory to determine "communities" or a "community structure". According to graph theory the term community is used if nodes of the network can be grouped into node sets, so that each node set is closely connected internally via its edges. This preferably means that a community contains groups of nodes with close connections internally and fewer connections to other nodes (of other communities).

To form graphs and determine communities it is first determined for the respective diagnostic candidate in a frame which image regions in other frames correspond to the diagnostic candidate. Since the frames represent a chronological operational sequence and in each case show the same motif, an examination is therefore made to see how the image region of the diagnostic candidate changes over time and how the diagnostic candidate would be mapped in the other frames. For better understanding these image regions, which represent the diagnostic candidate, are referred to as "candidate image regions". For example, in the frames of a coronary angiography sequence a series of possible stenoses is identified and these are marked (the individual diagnostic candidates). Since the heart moves over the time of the acquisition, something different is mapped in each frame. However, since this movement is known, it is possible to determine where the location of the potential stenosis (the candidate image region) ought to have been situated in which frame.

The individual diagnostic candidates will later be the nodes in the graph. Using chronological propagation, in other words the determined candidate image regions, the edges for a diagnostic candidate are now determined. This takes the form of an examination as to whether the candidate image regions of the diagnostic candidate in the other frames overlap with other diagnostic candidates. In figurative terms it can be imagined that the diagnostic candidates and the candidate image regions of one of the diagnostic candidates are marked in the frames and are then examined to see whether overlaps exist. Overlaps can obviously be determined purely mathematically.

A graph can now be created containing the diagnostic candidates as nodes and the overlaps as edges. It must be remembered that this graph initially represents only the relationship between the other diagnostic candidates and the one diagnostic candidate currently under consideration. When forming a graph after multiple diagnostic candidates have been considered this graph can have a highly complex network of edges.

This graph can be configured very easily, in that only a binary reproduction is given of whether an overlap of another diagnostic candidate with a candidate image region was present in a frame (edge between the diagnostic candidate under consideration and the other diagnostic candidate) or not (no edge). However, a strength of the edges can also be assumed in the graph from the degree of overlap ("strong" edge in the case of a strong overlap, "weak" edge in the case of a weak overlap).

On the basis of the graph, communities are now created, which could also be referred to as "diagnostic candidate communities". In the simplest case (binary) the nodes, which are connected via edges, can simply be combined to form a community. If the edges have different strengths, the strength can be compared to a threshold value and only edges equal to or greater than a specific strength can be regarded as of relevance to the formation of communities and the other edges that are too weak can be ignored.

Even though the step of formation of the communities of each graph (of the aforementioned individual graphs) can be performed separately, it is particularly preferred to perform the steps explained above first for the number of diagnostic candidates under consideration. To this end it should be noted that the method steps following the determination of the diagnostic candidates should be performed not just for one diagnostic candidate but for multiple diagnostic candidates, in particular all of them. Consequently multiple graphs can be produced, in which the edges in each case emanate from a node (namely the diagnostic candidate currently under consideration) or a single graph can be produced which includes all edges (which then emanate from all diagnostic candidates under consideration). It is possible to examine a graph for communities directly after it has been formed, but it is advantageous for all graphs to be formed first or for all edges in the resulting graphs to be created and only then to search for communities.

All graphs can now be examined jointly for the formation of communities or the individual graph containing the common edges. This combined procedure has the particular advantage that diagnostic candidates in a frame, which are both correlated with a diagnostic candidate from another frame, are combined in a community and further relationships between diagnostic candidates can also be revealed.

One or more example embodiments of the present invention therefore concentrates on the aggregation of diagnostic findings across multiple frames in an image sequence, e.g. an X-ray angiography sequence, and can also take place across multiple views, as set out in greater detail below, e.g. multiple angiography sequences for the same patient in the case of different acquisition angles or at different points in time.

The inventive system for the automated determination of examination results in an image sequence, in particular an angiography sequence, containing multiple chronologically consecutive frames, comprises the following components:
 a diagnostic study unit, designed for the determination of diagnostic candidates in the form of contiguous image regions in the individual frames for a predefined diagnostic finding,
 a propagation unit designed for the determination for a diagnostic candidate in a frame as to which candidate image regions in other frames correspond to the diagnostic candidate,
 a relation unit designed for the determination of overlaps which specify whether the candidate image regions of the diagnostic candidate in the other frames overlap with other diagnostic candidates,
 a graph unit designed for the generation of a graph containing the determined diagnostic candidates in the frames as nodes and the determined overlaps as edges,
 a community unit designed for the generation of communities containing nodes connected via edges, wherein nodes are combined to form a community.

The system can also comprise an output unit for outputting the communities or a diagnostic study unit for further examinations of the communities.

The system can therefore track the same diagnostic finding across multiple frames (and if appropriate views) and in particular can be designed to generate a list of stenosis diagnostic findings with correspondences across multiple frames (and multiple views) following the input of a (multiple-view) X-ray angiography examination. The system is preferably designed for the performance of the inventive method.

One or more example embodiments of the present invention can therefore help to prevent duplicate diagnostic findings being reported at patient level and to increase the reliability of diagnostic findings and associated measurements. It can furthermore in particular further improve automatic stenosis identification and evaluation as well as algorithms for an automated classification or QCA or lumen segmentation, since results from multiple individual frames can be combined in order to generate a better estimate, to filter noise or to identify errors.

An inventive medical technology system is in particular a diagnostic study system or an angiography system, but can also for example be a CT system or an MRT system. It comprises an inventive system and/or is designed for the performance of an inventive method.

Most of the aforementioned components of the system can be implemented wholly or partially in the form of software modules in a processor of a corresponding computing system. A largely software-based implementation has the advantage that even computing systems already in use can easily be retrofitted with a software update to work in the inventive manner. In this respect the object is also achieved by a corresponding computer program product with a computer program which can be loaded directly into a computing system, with program sections in order to execute the steps of the inventive method if the program is executed in the computing system. Such a computer program product can if appropriate comprise, as well as the computer program, additional elements such as for example documentation and/or additional components, as well as hardware components, such as for example hardware keys (dongles, etc.) for the use of the software.

For transportation to the computing system or to the control device and/or for storage on or in the computing system or the control device use can be made of a computer-readable medium, e.g. a memory stick, a hard disk or another transportable or built-in data medium on which are stored the program sections of the computer program that can be read and executed by a computing system. To this end the computing system can for example have one or more interoperating microprocessors or the like.

Further particularly advantageous embodiments and developments of the invention emerge from the dependent claims and the following description, wherein the claims in one claim category can also be developed analogously to the claims and descriptive sections for another claim category and in particular individual features of different exemplary embodiments or variants can also be combined to form new exemplary embodiments or variants.

In accordance with a preferred method the diagnostic candidates are representatives of medical diagnostic findings. These diagnostic findings are in particular diagnostic findings of pathologies, although this is not mandatory. In principle they can be any diagnostic findings made using other anatomical features, e.g. bifurcations of vessels. However, the method is particularly advantageous in the field of angiography. Hence a diagnostic candidate is particularly preferably a diagnostic finding from this region. A preferred diagnostic candidate represents the discovery of a vascular irregularity, in particular a stenosis. It should be remembered that the diagnostic candidates are here merely regions in images, e.g. contiguous pixel groups. Hence the term "represents" is used, since these regions (graphically) reflect a diagnostic finding.

A preferred method relates to an advantageous determination of diagnostic candidates. It comprises the steps:
 generation of a feature map in an examined frame, in which regions, in particular pixels, are in each case marked with at least one probability value for a diagnostic candidate, in particular using an image-to-image convolution network, which is trained using real frames containing manually marked diagnostic candidates,
 formation of contiguous image regions on the basis of the feature map, preferably by comparing the probability values with a limit value and formation of contiguous image regions, in which the probability values lie beyond the limit value, in particular via a connected component analysis (COCA),
 output of the regions as diagnostic candidates.

Thus a generated feature map ("activation map") not only contains purely graphical image information in the examined frame, but also regions that have different probability values for a diagnostic candidate. For example, the feature map has the same resolution as the original frame, wherein each pixel in the feature map corresponds to a pixel in the frame and each pixel in the feature map now bears a value which shows the probability with which the corresponding pixel in the image represents a diagnostic finding, or is part of a diagnostic finding.

The feature map is generated using a machine-learning model trained for this purpose, in particular an aforesaid image-to-image convolution network (e.g. a U-net). Such a model can be trained using real frames, in which diagnostic candidates have been marked manually.

In addition to outputting the feature map, such an algorithm can preferably also generate an uncertainty map for comparison or as confidence in the probabilities of stenoses output. Such measures of uncertainty or confidence could be used to filter or improve the results of stenosis candidates at this stage or in connection with one of the subsequent steps.

Contiguous image regions can now be formed on the basis of this feature map, e.g. simply by combining similar regions of the feature map and a corresponding combination of image regions.

To this end the feature maps obtained (the probability values thereof) are compared to a limit value. In this case it is possible simply to look at which probability values of the feature map lie above a predefined limit value. The resulting parts of the feature map (that lie beyond the limit value) are now combined and contiguous image regions are accordingly combined in the images. Combination to form contiguous image regions is in this case the prior art, e.g. using the preferred method of connected component analysis (CCA).

The determined contiguous image regions are then the diagnostic candidates. They are preferably numbered or are provided with an address or identification, so that they can be better processed in connection with the subsequent method steps.

A preferred method is concerned with the determination of corresponding candidate image regions in other frames for a diagnostic candidate in one of the frames. It comprises the following steps:
  assessment of a deformation field which models the movement of an image region mapped in the frames between a first frame and a second frame, wherein both the frames are preferably chronologically adjacent,
  registration of the image region of the diagnostic candidate of the first frame to a candidate image region of the second frame via the deformation field.

Also considered is how the image region of a diagnostic candidate under consideration changes over time between the frames of both the frames under consideration. The deformation field in this case reflects this change or contains data on this change. Such deformation fields are known in the prior art and contain previously known movement information. For example, the movement of a human heart is well known and therefore also the movement of vessels on and in the heart. In the case of coronary angiography it is known precisely where the heart is located in the frames (it is mapped in the frames) and so, with the knowledge of where a frame is located chronologically in the cardiac cycle, a change in the heart to the next frame can be predicted and therefore also how which image region is mapped in the next frame.

It is however also possible individually to use the image information for both the frames under consideration to calculate a deformation field. To this end the first frame is registered to the second frame (the image information is brought into alignment by geometric changes such as e.g. compressions and elongations). The geometric changes required for this then represent the deformation field.

If the deformation field is determined it can be used to register the image region of the first frame, in other words the diagnostic candidate, to a corresponding image region in the second frame. For better differentiation the moving image region of the first frame is referred to in the second frame as a "candidate image region". In the acquired motif the image region and the candidate image region always represent the same region.

Briefly stated, a check is made to see where the diagnostic candidate of the first frame would be located in the second frame and what it looks like there. For example, the deformation field can specify the change in vessels between two frames.

This preferred method can in each case be performed, starting from the frame of the diagnostic candidate as the first frame, for all other frames as the second frame in each case. However, it is preferable for the first frame and the second frame to be chronologically adjacent, in other words to be directly consecutive. The advantage of this is that the deformation field only has to map a short timespan. Thus a propagation of an image region to a candidate image region is preferably calculated from chronologically adjacent frames in each case. This is preferably done by calculating or providing a deformation field for chronologically adjacent frames in each case and after registration of the image region of the diagnostic candidate of the first frame to a candidate image region of the second frame of the registered diagnostic candidate in the second frame (in the candidate image region) is regarded as a new diagnostic candidate. When the preferred method is run again the second frame then becomes the first frame and the next chronologically adjacent frame becomes the second frame. The above method steps are therefore again applied to the result of a previously run method (where appropriate with another deformation field in each case). Deformation fields between adjacent frames can also be calculated and these are then applied sequentially, in order for example to map a diagnostic candidate from frame 1 to frame 4, by applying transitions T1-2, T2-3, T3-4 sequentially to the diagnostic candidate. Alternatively a deformation field from frame 1 to frame 4 can also be calculated directly, although this could be associated with an increased lack of precision.

Since it may be the case that diagnostic candidates overlap only partially with a candidate image region, this can be made apparent in the edges of the graph.

In accordance with a preferred method a weighting is to this end assigned to the edges. This weighting is preferably based on the degree of overlap, particularly preferably using a similarity analysis or distance analysis, in particular of the Dice coefficient, for the corresponding image regions of the diagnostic candidates. The determination of measures of similarity and distance, in particular of the Dice coefficient, is known in the prior art. In a simple example a standardized measure can be determined which specifies how large the overlap is between a diagnostic candidate and a candidate image region, e.g. what percentage of the image region of a diagnostic candidate overlaps with the candidate image region.

Alternatively or additionally the degree of overlap or the weighting of an edge can be determined on the basis of further examinations. In this case it is preferable to take into consideration the chronological interval between the frames, since a larger chronological interval means greater uncertainty as to whether the candidate image region has been correctly determined. A probability or an uncertainty value can then also be easily determined, these specifying how much the candidate image region and the diagnostic candidate overlap one another. Multiple approaches are possible here. For example, an uncertainty map from a U-net model can be used. If for example only a partial overlap is present, and the overlapping region is located in the vicinity of increased "uncertainty", the edge weight could be reduced. A calculation of the overlap need not however necessarily be made using a deformation field, and a machine-learning-based approach would also be possible, which determines a type of "measure of overlap" directly. This can be realized for example by training a machine-learning model with pairs of overlapping diagnostic candidates. Such an approach can then if appropriate also output measures of uncertainty in addition to a "probability of overlap".

In accordance with a preferred method, algorithms from graph theory are used to generate the communities. Graph theory and general algorithms for generating communities are known in the prior art. In this case it is preferable for communities to be generated by trimming edges and/or nodes in accordance with predefined criteria, and then for an analysis of connected nodes on the graph to be performed to determine communities, and for a community to be generated from connected nodes. Thus in this case some edges or nodes are not initially taken into consideration in the formation of communities, e.g. nodes which obviously cannot be part of a community (e.g. because their diagnostic candidates are errors) or edges which obviously do not contribute to the community (e.g. because they are too uncertain). This trimming is based in particular on a weighting of the edges, described above, wherein the weighting (or "strength") of the edges is particularly preferably compared to a predefined limit value and all edges with a weighting below the limit value are not taken into consideration ("trimmed") in the formation of a community. Alternatively it is preferable for communities to be generated via community algorithms, in particular on the basis of minimum intersection methods, hierarchical clustering, a Girvan-Newman algorithm, a modularity maximization, a statistical interference, or on clique-based methods. These minimum intersection methods are the prior art.

In accordance with a preferred method, multiple diagnostic findings in the same frame are assigned to the same community. By this is meant that multiple diagnostic candidates of the same diagnostic finding in the same frame are assigned to the same community and/or diagnostic candidates of different diagnostic findings (in the frame) are assigned to the same community. As regards the first alternative it should be noted that when multiple diagnostic candidates are taken into consideration it transpires that two diagnostic candidates of a frame overlap with a candidate region (in this frame) of another diagnostic candidate (in another frame). Both these diagnostic candidates, which are actually separate, are then assigned to the same community. As regards the second alternative the method can also be used simultaneously for multiple diagnostic findings. This results in diagnostic candidates for different diagnostic findings. These can be treated separately when generating the communities or in a community diagnostic candidates can also be combined to form different diagnostic findings.

In accordance with a preferred method the structure of a community is evaluated and on the basis thereof one frame in the image sequence is selected as the key frame. In this case it is preferable for a key frame to be selected for an identified diagnostic finding by determining a node (which represents a diagnostic candidate) that is given maximum support within the community. In particular the frame in which this node is mapped is then simply selected as the key frame. This frame can however also be overlapped by projections of diagnostic candidates of other frames and/or projections of candidate regions of the determined node in other frames. The determination of said node is preferably based on a quantitative measure for support. One measure for support is preferably the number and/or weighting of edges of other nodes. Alternatively a measure for support is preferably derived from graph theory, in particular from graph centrality algorithms (prior art), which assign importance indices to each node within a graph. This produces a mechanism for the automatic extraction of key frames for each diagnostic finding which is of advantage for the automatic creation of (human-)readable, visual reports.

A preferred system for this comprises a key frame unit which is designed for the determination of a key frame as described above. In this case a frame is preferably determined using the properties of the graph community structure.

The method is however also of advantage if multiple image sequences are present that have been acquired from different acquisition positions or during different examinations. This multi-view aggregation can be achieved in a number of ways.

The method is preferably performed for a plurality of image sequences from multiple chronologically consecutive frames in each case that have been acquired from different acquisition positions or during different examinations. In this case the diagnostic candidates from the image sequences are combined in a graph (in particular a common graph).

In this case it is preferable in connection with a first alternative that in connection with the multi-view aggregation edges between nodes of diagnostic candidates are generated from different image sequences, in particular using a 3D reconstruction and/or multi-view matching algorithms. In this case a graph containing all diagnostic candidates found is preferably formed as a node, wherein diagnostic candidates from different image sequences can be arranged in different regions (e.g. in an additional height dimension), and then edges are formed between the nodes, wherein for a number of the diagnostic candidates (in particular all diagnostic candidates) the following steps are additionally performed in compliance with the original method:

determination for a diagnostic candidate in a frame of a first image sequence as to which candidate image regions in other frames of a second image sequence correspond to the diagnostic candidate, determination of whether the candidate image regions of the diagnostic candidate in frames of the second image sequence overlap there with other diagnostic candidates.

For a diagnostic candidate the determination of corresponding candidate image regions in other frames preferably entails the following steps:

assessment of a change field, which models the difference in the acquisition position or in the examination parameters between both the image sequences, registration of the image region of the diagnostic candidate in the first image sequence to a candidate image region of a frame of the second image sequence via the change field.

In respect of changes in the acquisition position the change field is simple to assess, since the change in the acquisition position is known. Since in principle the motif remains the same and only the acquisition apparatus moves, the change field can be represented simply by a displacement and a rotation in space (if appropriate additionally defined by a displacement of the center of rotation). A further possibility for determining the change field is epipolar geometry. For example, in angiography sequences the acquisition geometries are known. The angles and distance of the patient in each case to the radiation source and the detector are therefore known. In the case of two different frames (image sequences) the epipolar geometry known in the prior art can in this way be used to determine in which region in a frame from a first image sequence a point in a frame from a second image sequence would be mapped. However, in this case the epipolar geometry often only defines a line on which the point in question must be located. Where exactly on the line the point is located is not known. However, this information can also be used to form the edges: if a diagnostic candidate in frame A of a first image sequence is located on epipolar lines of a diagnostic candidate in image B of a second image sequence, an edge would be inserted between the corresponding nodes. This edge can preferably reflect the degree of overlap between the diagnostic candidates. In this case it is preferable for these results to be further filtered subsequently or for additional information to be included in the creation of the edges, e.g. whether the vascular segment is the same. To this end an assignment of the vascular segments can be made in advance. Alternatively a similarity measure can be used for an assignment of diagnostic candidates.

In respect of different examinations (which can very much be hours, days, months or years apart) the change field can correspond to a deformation field as described above, in particular if during the examinations the physical circumstances have not significantly changed. For example, nothing significant will change in the heartbeat of a patient. However, the angle of acquisition could have changed. Thus the change field can also be a mixture of a (chronological) deformation field and a (spatial) change field as described above. If the examination parameters were virtually identical, the change field can also simply be the identity.

It is preferable for the frame in the second image sequence to correspond chronologically to the frame of the diagnostic candidate in the first image sequence. By this is meant that in the case of a defined movement (e.g. a cardiac cycle) both the frames under consideration reflect the same relative point in time of the movement (or at least a corresponding one). However, it would also be possible to work with a change field and additionally a deformation field (see above).

This results in a very complex graph, which however can easily be evaluated using graph-based procedures for the generation of the communities, since singly the number of edges and nodes is greater than in the case of application to a single one of the image sequences.

Alternatively or additionally it is preferable in connection with a second alternative for an aggregation of multiple views to be achieved gradually or hierarchically, in particular wherein initially the communities are calculated separately for each image sequence and then a community graph is formed with these communities of the graphs as nodes and the nodes of this community graph are again combined into communities.

Therefore individual diagnostic candidates are no longer present as nodes in the community graph, but individual graphs are initially determined for each image sequence, and communities are determined therefrom. These communities can be marked in frames of the individual image sequences or can be displayed in an individual frame representing the image sequence. Once again, as in the first alternative, a change field (in principle the same one, since the same change in the acquisition position is involved) is now applied for these frames and an overlap of the communities is determined. This overlap then yields the edges of the community graphs. Via these edges nodes of the graph (as previously for the diagnostic candidates) can be combined to form "supercommunities".

A corresponding system is designed to process a plurality of image sequences from in each case multiple chronologically consecutive frames that were acquired from different acquisition positions or during different examinations. It is designed to combine the diagnostic candidates from the image sequences in a graph. To this end the graph unit is preferably designed:

to generate edges between nodes of diagnostic candidates from different image sequences in connection with a multi-view aggregation, or to achieve an aggregation of multiple views gradually or hierarchically, in particular wherein initially the communities are calculated separately for each image sequence and then a community graph containing these communities of the graphs as nodes is formed and the nodes of this community graph are again combined into communities.

AI-based methods (AI: "Artificial Intelligence") are preferably used for the inventive method. Artificial intelligence is based on the principle of machine-based learning, and is generally performed with a teachable algorithm that has been trained accordingly. For machine-based learning use is frequently made of the expression "machine learning", this also including the principle of "deep learning".

Components of One or more example embodiments of the present invention are preferably present as a "cloud service". Such a cloud service is used to process data, in particular via artificial intelligence, but can also be a service based on conventional algorithms or a service in which an evaluation is performed in the background by humans. Generally a cloud service (also referred to for short below as the "cloud") is an IT infrastructure, in which for example storage space or computing power and/or application software is made available via a network. The communication between the user and the cloud in this case takes place via data interfaces and/or data transfer protocols. In the present case it is particularly preferable for the cloud service to make both computing power and application software available.

In connection with a preferred method, data is provided to the cloud service via the network. This comprises a computing system, e.g. a computer cluster, which generally does not include the user's local computer. This cloud can in particular be made available by the medical device that also provides the medical technology systems. For example, the data in an image acquisition is sent to a (remote) computer system (the cloud) via an RIS (radiology information system) or PACS. The computing system of the cloud, the network and the medical technology system preferably represent a grouping in the information technology sense. The method can in this case be realized in the network via a command constellation. The data calculated in the cloud ("result data") is subsequently again sent to the user's local computer via the network.

Figure 3:
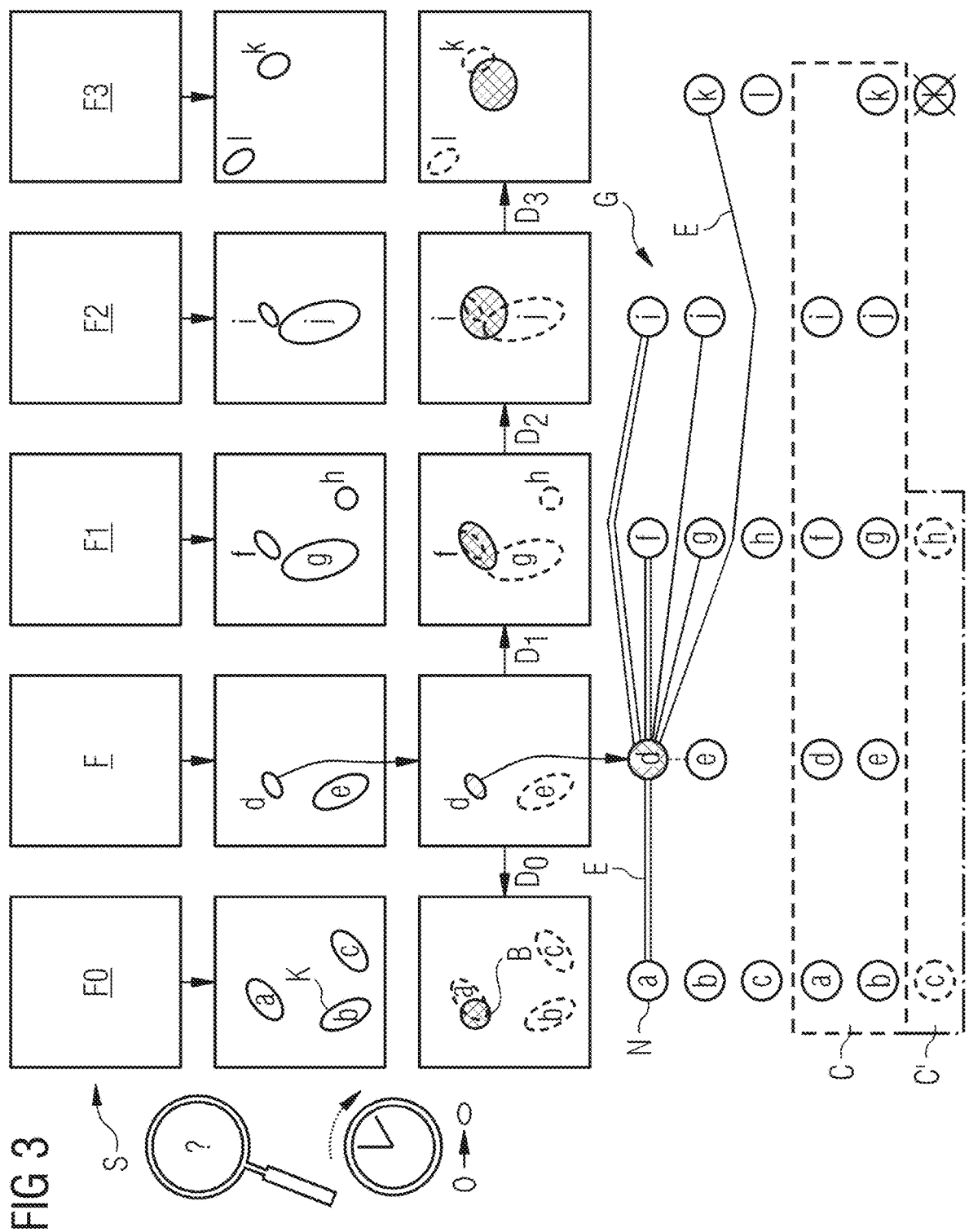
FIG. 3 shows the operational sequence of an exemplary method in practice.
Figure 4:
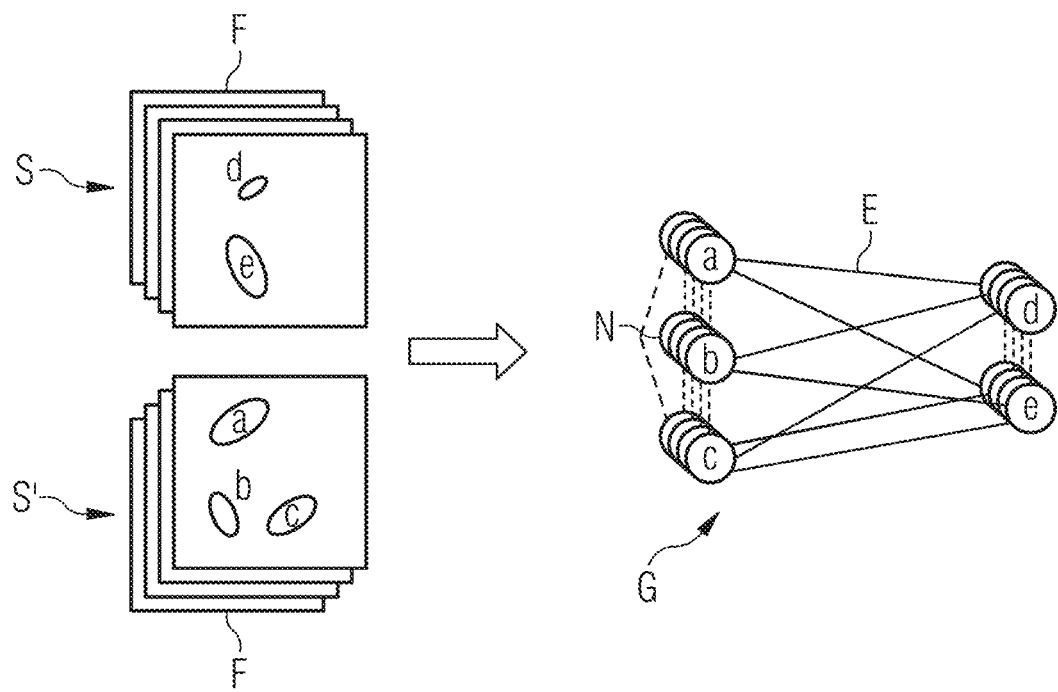
FIG. 4 shows a method with multiple image sequences from different acquisition positions according to an example embodiment.

FIG. 1 shows a block diagram of the operational sequence of an exemplary method for the automated determination of examination results in an image sequence S from multiple chronologically consecutive frames F (see also FIGS. 3 and 4). The method can for example be performed for the determination of stenoses in the field of angiography.

Step I entails a determination of diagnostic candidates K in the form of contiguous image regions in the individual frames F for a predefined diagnosis. As indicated in the box from top to bottom, to this end a feature map M is initially generated in an examined frame F, in which are marked regions, here pixels, with in each case at least one probability value for a diagnostic candidate K. Different hatchings are here intended to indicate different probabilities. The denser the hatching, the higher the probability. This can preferably be done using an image-to-image convolution network, that has been trained with real and manually marked frames. After the feature map M has been created the probability values are compared to a limit value and contiguous image regions P are formed, in particular via a connected component analysis. In this example only the densely hatched, continuously bordered region in the center is above the limit value. These regions P are then defined as diagnostic candidates K. In this case a diagnostic candidate K can definitely be represented directly by an image region P, in other words here by a group of pixels. It can however also be represented by a link to such an image region P.

As indicated by the backward-pointing arrow, the subsequent steps are performed for multiple, in particular for all, diagnostic candidates K. In this case the resulting graph G, as indicated here, can contain all results and the subsequent steps can be performed just once (as shown here) or individual graphs G can be formed and the steps performed for the individual graphs G (which could however be more laborious overall).

Step II entails a determination for a diagnostic candidate K in a first frame F as to which candidate image regions B in a second frame F1 correspond to the diagnostic candidate K. To this end a deformation field D is initially assessed which models the movement of the diagnostic candidate K mapped in the first frame F between the first frame F and the second frame F1. In this example both the frames F, F1 are chronologically adjacent, in other words follow one another during an acquisition. In this case a registration of the image region P of the diagnostic candidate K of the first frame F to a candidate image region B of the second frame F1 is performed via the deformation field D.

Step III entails a determination as to whether the candidate image regions B of the diagnostic candidate K in the second frame F1 (and further frames) overlap with other diagnostic candidates K. Here it is not just possible to decide in a binary manner whether an overlap is present, but also the degree of overlap can be determined, in particular using the Dice coefficient for the corresponding image regions of the diagnostic candidates K. From this a weighting for the subsequently generated edges E can then be determined, in particular additionally taking into consideration the chronological interval of the frames F, F1 and/or a similarity of the diagnostic candidate K in the second frame F1 to the candidate region B in this second frame F1.

Step IV entails a generation of a graph G containing the determined diagnostic candidates K as nodes N and the determined overlaps as edges E. As indicated by the different thicknesses of the lines, a weighting has been performed. The backward-pointing arrow issues from this box, which is intended to indicate that the graph G is filled with edges E in the course of the method. If just a single diagnostic candidate K is considered, the edges E issue only from the node N of this diagnostic candidate K. If all diagnostic candidates K are considered, the edges E issue from all nodes N and form a complex network.

As was indicated above, an individual graph G can also be created for each examination of a diagnostic candidate K. However, to obtain more precise results about communities C, the individual graphs G would then again have to be correlated with one another, which calls for additional effort.

Step V entails a generation of communities C from nodes N connected via edges E, wherein nodes N are combined to form a community C. As can be seen here, in comparison to step IV a further continuous edge E was produced in the course of the evaluation of the diagnostic candidates K, for which reason the community C includes three nodes N or diagnostic candidates K.

Multiple communities C are generally formed in this step. Here too the single node N could be regarded as an independent community C. This depends on default settings. For example, it is possible to specify that single nodes N are not regarded as a community C (as is indicated here).

To generate the communities C use can be made of algorithms from graph theory. A community C can for example be generated by trimming edges E and/or nodes N in accordance with predefined criteria, in particular on the basis of the aforementioned weighting, then for the determination of communities C an analysis of connected nodes N on the graph G can be performed, and a community C can be generated from connected nodes N. Alternatively a community C can be generated via community algorithms.

In the operational sequence shown here the structure of the community C is additionally evaluated and on the basis of this one frame F, F1 of the image sequence S is selected as a key frame KF. The key frame KF can for example be selected by determining a node N that is given maximum support within the community C.

As regards the key frame KF, this can be advantageous in order to reduce the many frames in a community C to a single "screenshot", which rapidly shows the identified diagnostic finding on an image best suited for this purpose (e.g. without any overlap with other vessels). Such key frames KF with additional superimposition (QCA, . . . ) are frequently used in printed or PDF reports or for communication with patients.

Within this inventive graph-based framework the properties of the graph community structure can be used to derive the most suitable frame F as the key frame KF. For example, this can be selected for an identified diagnostic finding, by determining the diagnostic candidate K (node N) that is given the maximum "support" within the community C. Support could for example be defined as the node N which has the most edges E of other nodes N. Alternatively or additionally the weights of the detailed edges E can be summed for each node N. From the perspective of graph theory, graph centrality algorithms could be used that assign importance indices to each node within a graph.

Figure 2:
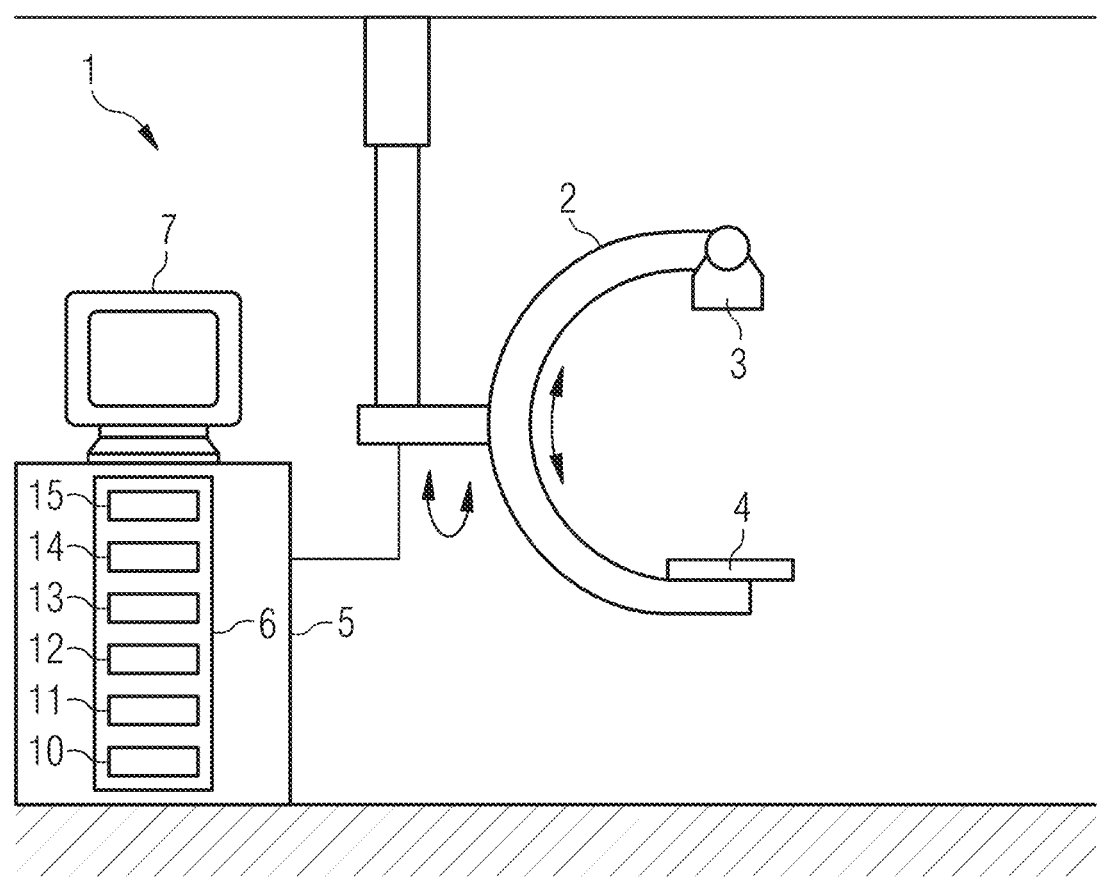
FIG. 2 shows a preferred medical technology system according to an example embodiment.

FIG. 2 shows a preferred medical technology system 1, e.g. an angiography system. The medical technology system 1 is a C-arm X-ray device 1, on the C-arm 2 of which an X-ray source 3 and a flat X-ray detector 4 is arranged. The C-arm 2 is designed such that it can perform a rotational movement around the examination object, during which it can acquire a series of projection images from different projection directions (arrows). This type of acquisition with subsequent reconstruction is for example referred to as cone-beam CT or else DynaCT. The C-arm X-ray device 1 is controlled via a system control unit 5 that contains a computing unit 6 in the form of an inventive system 6. To display the results a display unit 7 in the form of a computer terminal 7 is provided, which can definitely also be located in another room.

The inventive system 6 for the automated determination of examination results in an image sequence S from multiple chronologically consecutive frames F, F1 (e.g. FIGS. 1, 3 and 4) is designed for the execution of the inventive method (see e.g. FIG. 1) and includes the following components:

A diagnostic study unit 10, designed for the determination of diagnostic candidates K in the form of contiguous image regions in the individual frames F, F1 for a predefined diagnostic finding.

A propagation unit 11 designed for the determination for a diagnostic candidate K in a frame F as to which candidate image regions B in other frames F1 correspond to the diagnostic candidate K.

A relation unit 12 designed for the determination of overlaps, which indicate whether the candidate image regions B of the diagnostic candidate K in the other frames F1 overlap with other diagnostic candidates K.

A graph unit 13 designed for the generation of a graph G containing the determined diagnostic candidates K as nodes N and the determined overlaps as edges E.

A community unit 14 designed for the generation of communities C from nodes N connected via edges E, wherein nodes N are combined to form a community C.

And a key frame unit 15 designed for the determination of a key frame KF.

FIG. 3 shows the operational sequence of an exemplary method, as could be realized in practice for the diagnostic study of a stenosis in an image sequence S (here an angiography sequence). The image sequence here comprises a total of five frames F0, F, F1, F2, F3, which are representative of a plurality, in principle unlimited in quantity, of individual acquisitions (first row in the figure).

The stenosis diagnostic candidates K are first determined. In this case an algorithm working at individual image level, and which is indicated here in the form of a magnifying glass, identifies image regions that probably belong to a stenosis. In a practical implementation an image-to-image convolutional neural network (e.g. a U-net) can be used, which was trained on real data with corresponding manual stenosis annotations. In this case for example a feature map M (see FIG. 1) is output, wherein pixels with a high probability of stenosis have larger values. This feature map M is compared to limit values and a connected component (CC) analysis is started, in order to reduce them to stenosis candidates. These stenosis candidates, in other words the regions identified by the algorithm, are represented here as ellipsoids provided with lowercase letters in the second row of the figure and represent the diagnostic candidates K. They can in principle have any shape.

It is important to bear in mind that at this point it is still not known which diagnostic candidate K in a particular frame F corresponds to a diagnostic finding in another frame F0, F1, F2, F3. Each diagnostic candidate K is present as an autonomous element. Hence each diagnostic candidate is marked with a different letter across the various frames F0, F, F1, F2, F3. In addition to outputting the probability, such an algorithm can also generate uncertainty maps as confidence in the probabilities of stenosis that are output. Such measures of uncertainty or confidence could be used to filter or improve the results of diagnostic candidates K at this stage or later in one of the steps described in the following sections.

Next, each diagnostic candidate K is propagated through all frames F0, F1, F2, F3, as shown in the third row of the figure for an exemplary stenosis candidate (ellipsoid with the letter "d" in the second frame F from the left). "Propagate" here means that a simulation is performed of what the pixels of the diagnostic candidate K would look like in the other frames F0, F1, F2, F3, in other words what the diagnostic candidate K itself would look like in the other frames F0, F1, F2, F3. To this end it should be borne in mind that the frames F0, F, F1, F2, F3 all show the same motif (here the vessels, e.g. of a heart), which moves in accordance with known patterns. Because of the movement the region of the stenosis will also move and if appropriate its shape will also change. Hatched candidate image regions B in the third row are used to show what the diagnostic candidate K with the letter "d" would look like in the other frames F0, F1, F2, F3. The aim is to understand whether a possible match exists between two or more candidates from different frames on the basis of their relative position.

For this purpose deformation fields D0, D1, D2, D3 are initially assessed. The deformation fields D0, D1, D2, D3 can all emanate from the frame F of the diagnostic candidate K just considered (here "d"), but in this example relate to a propagation viewed from the respective neighboring frame. This can be done with standard registration methods or with AI-based registration algorithms or matching algorithms, as are already known in the prior art. These deformation fields D0, D1, D2, D3 are here applied consecutively to the pixels of the diagnostic candidate K under consideration or the candidate image regions of the neighboring frame, in order to calculate in which region the stenosis candidate would probably be located in each other frame F0, F1, F2, F3.

The degree of overlap of the candidate image region B in a frame F0, F1, F2, F3 with a diagnostic candidate K in this frame F0, F1, F2, F3 is now determined (also in row 3).

This is performed for all diagnostic candidates K in all frames F0, F, F1, F2, F3.

Next, a graph G is constructed, which can be directed or undirected, wherein the nodes N are the diagnostic candidates K from all frames F0, F, F1, F2, F3. These are visualized here as circles in the fourth row in the figure. Edges E between the nodes N are added on the basis of the results from the previous step. Here only the edges E emanating from the diagnostic candidate K with the letter "d" are shown. When considering the other diagnostic candidates K further edges E will be added, thereby producing a network. In addition, an edge weight has been added here on the basis of the degree of overlap, this being indicated graphically by different line thicknesses. The greater the degree of overlap the thicker the edge E. For example, the edge weighting can be determined from the amount of the overlap using the DICE score between two regions.

As soon as the graph G is created, its structure can be analyzed in order to identify closely connected subsets of nodes N, which are known in graph theory as "communities" C, C'. Nodes N in the same community C, C' relate to subsets of diagnostic candidates K which with high probability all represent the same stenosis diagnostic finding across multiple frames F0, F, F1, F2, F3.

This is represented in the fifth row in the figure, it being noted that the nodes N with the letters "b" and "e" are not counted as forming part of the community C by virtue of the edges E from the examination of the node N with the letter "d", but by virtue of further edges E, which for greater clarity are not shown in the graph G (the graph only shows the evaluation of a single diagnostic candidate K). However, as can readily be seen, the nodes N with the letters "b" and "e" overlap with the node N with the letter "g" and are thus indirectly connected to "d". The nodes N with the letters "c" and "h" belong to another community C'.

In the prior art, known graph algorithms can be used for the formation of the communities C, C'. For example, particular edges E or nodes N are first trimmed in accordance with predefined criteria (e.g. on the basis of a minimum edge weight) and then an analysis of connected nodes on the graph is performed, in order to find communities C, C'.

The node N with the letter "l" is here deleted, since it does not overlap with any of the other diagnostic candidates K, or their candidate regions B. This example relates to an erroneous classification as a diagnostic candidate K. During the evaluation it was established that individual nodes N without an edge E are ignored in the formation of communities C, C'.

Each community C, C' groups a series of diagnostic candidates K to form a single diagnostic finding at overall sequence level.

FIG. 4 shows a method with multiple image sequences S, S' from different acquisition positions. To form the graph in the case of multi-view aggregation, stenosis correspondences can be created across multiple views in a number of ways, including, but not restricted to, 3D reconstruction and multi-view matching algorithms. The aggregation of multiple views can be performed together with the above-described chronological aggregation at sequence level, by creating a larger graph G which covers all diagnostic candidates K from all acquisition positions and also permits edges E between nodes N from different acquisition positions (for example on the basis of 3D reconstruction correspondence). Alternatively the aggregation of multiple views can be achieved gradually or hierarchically. In one case the communities C could first be calculated separately at sequence level as described above for all acquisition positions and then the communities C from the first step could be further aggregated across multiple views with a separate diagram.

Shown here is a method for a plurality of image sequences S, S' from multiple chronologically consecutive frames F in each case, which were acquired from different acquisition positions. The diagnostic candidates K from the image sequences S, S' are combined here in a single graph G. In this case in connection with a multi-view aggregation, edges E between nodes N of diagnostic candidates K are generated from different image sequences S, S'. Communities C can then again be determined from this graph as explained above. Since the acquisition positions are known, a change field can easily be calculated to establish an overlap of diagnostic candidates K with candidate regions B of different image sequences S, S', said change field mapping a diagnostic candidate K in a frame F of one image sequence S in a candidate region B in a frame F of another image sequence S'.

In conclusion it is once again noted that the illustrations described in detail above relate solely to exemplary embodiments that can be modified by the person skilled in the art in a number of ways, without departing from the scope of the invention. Further, the use of the indefinite article "a" or "an" does not rule out that the features in question may also be present multiple times. Likewise the terms "unit" and "module" do not rule out that the components in question consist of multiple interacting subcomponents that if appropriate may also be distributed spatially. The term "a number" is to be understood as "at least one".

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein and mentioned above, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units (e.g., computing unit) and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The term 'module' may refer to, be part of, or include processor hardware (shared, dedicated, or group) that executes code and memory hardware (shared, dedicated, or group) that stores code executed by the processor hardware.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A method for an automated determination of examination results in an image sequence from multiple chronologically consecutive frames, the method comprising:

determining diagnostic candidates as contiguous image regions in individual frames for a predefined diagnostic finding; and
   for a number of the diagnostic candidates,
      determining which candidate image regions in other frames correspond to a particular diagnostic candidate,
      determining whether the candidate image regions of the particular diagnostic candidate in the other frames overlap with other diagnostic candidates,
      generating a graph containing the determined diagnostic candidates of the frames as nodes and the determined overlaps as edges, and
      generating communities from nodes connected via edges.

2. The method of claim 1, further comprising:
   outputting the communities or using the communities for further examinations.

3. The method as claimed in claim 2, wherein the further examinations include an X-ray angiography examination.

4. The method of claim 1, wherein
   the diagnostic candidates are representatives of medical diagnostic findings.

5. The method of claim 4, wherein the medical diagnostic findings are in the field of angiography, wherein at least one diagnostic candidate represents the finding of a vascular irregularity.

6. The method of claim 1, wherein the determining the diagnostic candidates comprises:
   generating a feature map in an examined frame, the feature maps including regions that are marked with at least one probability value for a corresponding diagnostic candidate of the diagnostic candidates;
   forming contiguous image regions based on the feature map; and
   output of the regions as the diagnostic candidates.

7. The method of claim 6, wherein the forming includes, comparing the probability values of the feature map to a limit value, the contiguous image regions including the image regions in which the probability values exceed the limit value.

8. The method of claim 6, wherein the generating the feature map uses an image-to-image convolution network, the image-to-image convolution network being trained with real frames with manually marked diagnostic candidates.

9. The method of claim 1, wherein the determining the corresponding candidate image regions in other frames includes,
   assessing a deformation field including modeling a movement between a first frame and a second frame; and
   registering of an image region of the diagnostic candidate of the first frame to a candidate image region of the second frame using the deformation field.

10. The method of claim 1, further comprising:
    weighting the edges, the weighting being based on at least one of
       a degree of overlap,
       a chronological interval between the frames,
       a similarity,
       a probability, or
       an uncertainty value.

11. The method of claim 1, wherein the generating generates the communities by
    trimming at least one of the edges or the nodes based on predefined criteria, or using community algorithms.

12. The method of claim 1, wherein the generating the communities includes,
assigning multiple diagnostic findings in the same frame to a same community.

13. The method of claim 1, further comprising:
evaluating a structure of at least one of the communities, the evaluating including selecting one frame in the image sequence as a key frame, wherein the key frame is selected for an identified diagnostic finding by determining a node that is has maximum support within the community.

14. The method of claim 1, wherein the method is performed for a plurality of image sequences from multiple chronologically consecutive frames acquired from different acquisition positions or during different examinations, and the diagnostic candidates from the image sequences are combined in the graph.

15. A non-transitory computer program product comprising commands which when the program is executed by a computer cause said computer to execute the method of claim 1.

16. A non-transitory computer-readable medium comprising commands which when executed by a computer cause said computer to execute the method of claim 1.

17. A system for an automated determination of examination results in an image sequence from multiple chronologically consecutive frames, the system comprising:
a diagnostic study unit configured to determine diagnostic candidates as contiguous image regions in individual frames for a predefined diagnosis;
a propagation unit configured to determine for a diagnostic candidate in a frame as to which candidate image regions in other frames correspond to the diagnostic candidate;
a relation unit configured to determinate overlaps, the overlaps indicating whether the candidate image regions of the diagnostic candidate in the other frames overlap with other diagnostic candidates;
a graph unit configured to generate a graph containing the determined diagnostic candidates in the frames as nodes and the determined overlaps as edges;
a community unit configured to generate communities from the nodes connected via edges; and
one of,
an output unit configured to output the communities, or
a diagnostic study unit configured to further examine the communities.

18. The system of claim 17, wherein the system is configured to process a plurality of image sequences from multiple chronologically consecutive frames acquired from different acquisition positions or during different examinations, and the diagnostic candidates from the image sequences are combined in the graph.

19. The system of claim 17, further comprising:
a key frame unit configured to determine a key frame using properties of a structure of at least one community.

20. A medical technology system comprising the system of claim 17.

* * * * *